United States Patent
Olofsson et al.

(12)

(10) Patent No.: US 12,331,834 B2
(45) Date of Patent: Jun. 17, 2025

(54) O-RING SEAL AND FLUID CONNECTION FOR A FLUID TRANSFER CIRCUIT COMPRISING SUCH A SEAL

(71) Applicant: AKWEL SWEDEN AB, Varberg (SE)

(72) Inventors: Jan Olofsson, Varberg (SE); Cécilia Lofgren, Varberg (SE)

(73) Assignee: AKWEL SWEDEN AB, Varberg (SE)

( * ) Notice: Subject to any disclaimer, the term of this patent is extended or adjusted under 35 U.S.C. 154(b) by 0 days.

(21) Appl. No.: 18/696,509

(22) PCT Filed: Sep. 29, 2022

(86) PCT No.: PCT/EP2022/077128
§ 371 (c)(1),
(2) Date: Mar. 28, 2024

(87) PCT Pub. No.: WO2023/052514
PCT Pub. Date: Apr. 6, 2023

(65) Prior Publication Data
US 2025/0003494 A1    Jan. 2, 2025

(30) Foreign Application Priority Data

Oct. 1, 2021    (FR) .................................. FR2110397

(51) Int. Cl.
*F16J 15/10*    (2006.01)
*F16L 37/12*    (2006.01)

(52) U.S. Cl.
CPC ......... *F16J 15/104* (2013.01); *F16L 37/1225* (2013.01)

(58) Field of Classification Search
CPC ..... F16L 37/1225; F16L 21/03; F16L 21/045; F16L 21/02; F16J 15/104; F16J 15/32

USPC .......................................... 285/374; 277/626
See application file for complete search history.

(56) References Cited

U.S. PATENT DOCUMENTS

| 2,647,770 | A | * | 8/1953 | Tollefsbol | ............... | F16L 21/03 |
| | | | | | | 277/910 |
| 3,195,902 | A | * | 7/1965 | Tisch | ................... | F16J 15/3456 |
| | | | | | | 277/436 |
| 3,831,954 | A | * | 8/1974 | Longfellow | ............ | F16L 21/03 |
| | | | | | | 285/918 |

(Continued)

FOREIGN PATENT DOCUMENTS

WO    2018/236731 A1    12/2018

OTHER PUBLICATIONS

Jan. 25, 2023 Search Report issued in International Patent Application No. PCT/EP2022/077128.

*Primary Examiner* — David Bochna
(74) *Attorney, Agent, or Firm* — Oliff PLC

(57) ABSTRACT

A seal includes an undulating profile following a circumferential path centered on a main axis, such that the path has a variable axial amplitude relative to a reference transverse plane perpendicular to the main axis between two, lower and upper, transverse planes and defines a non-planar geometric profile of the seal. The undulating profile has at least two peaks and at least two troughs that are formed by axial excursions relative to the transverse reference plane so that compression of the seal follows a stepped profile in which the steps are defined by the upper and lower planes and intermediate planes located between the upper and lower planes.

10 Claims, 5 Drawing Sheets

(56) References Cited

U.S. PATENT DOCUMENTS

| | | | | |
|---|---|---|---|---|
| 4,387,902 | A * | 6/1983 | Conover | F16J 15/32 |
| | | | | 277/560 |
| 5,997,008 | A * | 12/1999 | Pflug | F16L 19/0218 |
| | | | | 277/626 |
| 7,540,502 | B1 * | 6/2009 | Moore | F16L 23/20 |
| | | | | 277/606 |
| 11,846,377 | B2 * | 12/2023 | Ulrich | F16L 37/0885 |
| 2008/0217912 | A1 | 9/2008 | Chaupin | |
| 2015/0008645 | A1 * | 1/2015 | Epshetsky | F16J 15/32 |
| | | | | 277/307 |
| 2016/0084381 | A1 | 3/2016 | Bjorsvik | |
| 2021/0316407 | A1 * | 10/2021 | Günther | F16J 15/062 |
| 2024/0084897 | A1 * | 3/2024 | Cao | F16L 21/03 |

* cited by examiner

O-RING SEAL AND FLUID CONNECTION FOR A FLUID TRANSFER CIRCUIT COMPRISING SUCH A SEAL

TECHNICAL FIELD

The present invention relates to the technical field of transporting fluids such as air or water, in particular in a fluid transfer circuit. It can be applied more specifically but not exclusively to the transfer of fluid in a fuel circuit, an air or vacuum circuit, a steam circuit or a cooling circuit of an engine, a battery for an electric or hybrid vehicle, power electronics or other, for example by means of a heat exchanger. The invention relates more specifically to an O-ring seal and a fluid connection for fluid transfer of such a fluid transfer circuit comprising the seal.

In general, such a fluid connection comprises a female connector and a male connector with complementary internal and external shapes enabling them to cooperate by fitting together. The female connector thus comprises a receiving orifice designed to receive an end piece of the male connector in a form-fitting manner. Furthermore, the end piece of the male connector and the female connector can be locked together using quick-fit fasteners such as clips, latching tabs and/or fastening clamps.

In order to ensure the fluid-tightness of this quick coupling connection, it is conventional to provide an annular seal, for example an O-ring seal. This seal thus provides a fluid-tightness between the male connector and the female connector of the fluid connection.

In this case, in order to seal this interface, at least one of the end pieces is generally provided with an annular slot or groove shaped to receive the annular seal. In order to generate the sealing effect, the seal is compressed during fitting between the inner wall of the female receiving orifice and the outer wall of the male insertion end piece.

However, during fitting, the annular seal, by forming an annular bulge, generates an additional insertion effort. This insertion effort can reach such a level that manual assembly sometimes proves very tedious and can thus result in a relatively large amount of lost time during operations for assembling such fluid connections.

One object of the invention is in particular to propose a solution for reducing the insertion effort whilst guaranteeing a reliable seal.

PRIOR ART

Document US 2008/0217912 A1 is already known from the prior art and describes a fluid connection comprising a female connector and a male end piece designed to be fitted inside a receiving orifice of the female connector. The female connector has a peripheral shoulder on an inner wall of its receiving orifice delimiting a seat for receiving a seal. This receiving surface has a generally undulating shape in the circumferential direction and is thus shaped to receive a seal that is also undulating.

This specific configuration reduces the efforts required to insert the male end piece into the female receiver. In this known prior art, however, the presence of the seal can still generate an additional effort for fitting together the male and female connectors when passing over the undulating crests. The aim of the invention is in particular to propose to further reduce the insertion efforts without incurring significant additional costs.

SUMMARY OF THE INVENTION

To this end, one object of the invention is an O-ring seal for a fluid connection with a main insertion axis, of the type comprising an undulating profile following a circumferential path centred on the axis which has a variable axial amplitude relative to a reference transverse plane perpendicular to the main axis between two, lower and upper, transverse planes and designed to define a non-planar geometric profile of the seal, the undulating profile having at least two peak crests and at least two trough crests that are formed by axial excursions relative to the reference transverse plane, characterized in that at least one peak and one trough are located on the upper and lower planes respectively and at least the other of the peaks and troughs are each located on an intermediate transverse plane, the intermediate planes being axially offset from one another and located axially strictly between the two upper and lower planes in such a way that the compression of the seal follows a stepped profile in which the steps are defined by each of the upper, intermediate and lower planes.

The invention reduces the fitting or insertion efforts. The reduction in insertion efforts is achieved by modifying the geometry of the O-ring seal such that compression of the seal occurs gradually during axial insertion, thereby reducing instantaneous insertion efforts.

A seal according to the invention can also have one or more of the features set out below.

In one preferred embodiment of the invention, portions of the seal connecting the crests are curvilinear.

In one preferred embodiment of the invention, the peak crests and/or the trough crests each extend facing one another.

Another object of the invention is a fluid connection which can also have one or more of the following features.

In one preferred embodiment of the invention, the connectors have complementary shapes of mutual engagement delimiting, in the fitted state, an internal annular cavity for housing the seal.

In one preferred embodiment of the invention, the female connector comprises a peripheral shoulder internally delimiting a radial surface forming an annular sealing seat designed to receive the O-ring seal.

In one preferred embodiment of the invention, the female connector comprises a retaining ring inserted into the main body on the side of the connection end to define an annular groove, being open radially inwards and not being contained in a transverse plane for receiving the O-ring seal.

In one preferred embodiment of the invention, the seal is radially compressed inside the annular groove by the male connector after it has been inserted into the female connector.

In one preferred embodiment of the invention, the female connector comprises slots in a circumferential direction and also comprises a jumper engaged in the slots to retain the male connector inside the body of the female connector.

In one preferred embodiment of the invention, the male and female connectors are made from a plastic material or metallic material.

BRIEF DESCRIPTION OF THE DRAWINGS

Other features and advantages of the invention will become apparent upon reading the following description, provided with reference to the appended drawings in which.

DESCRIPTION OF THE EMBODIMENTS

Figure 1:
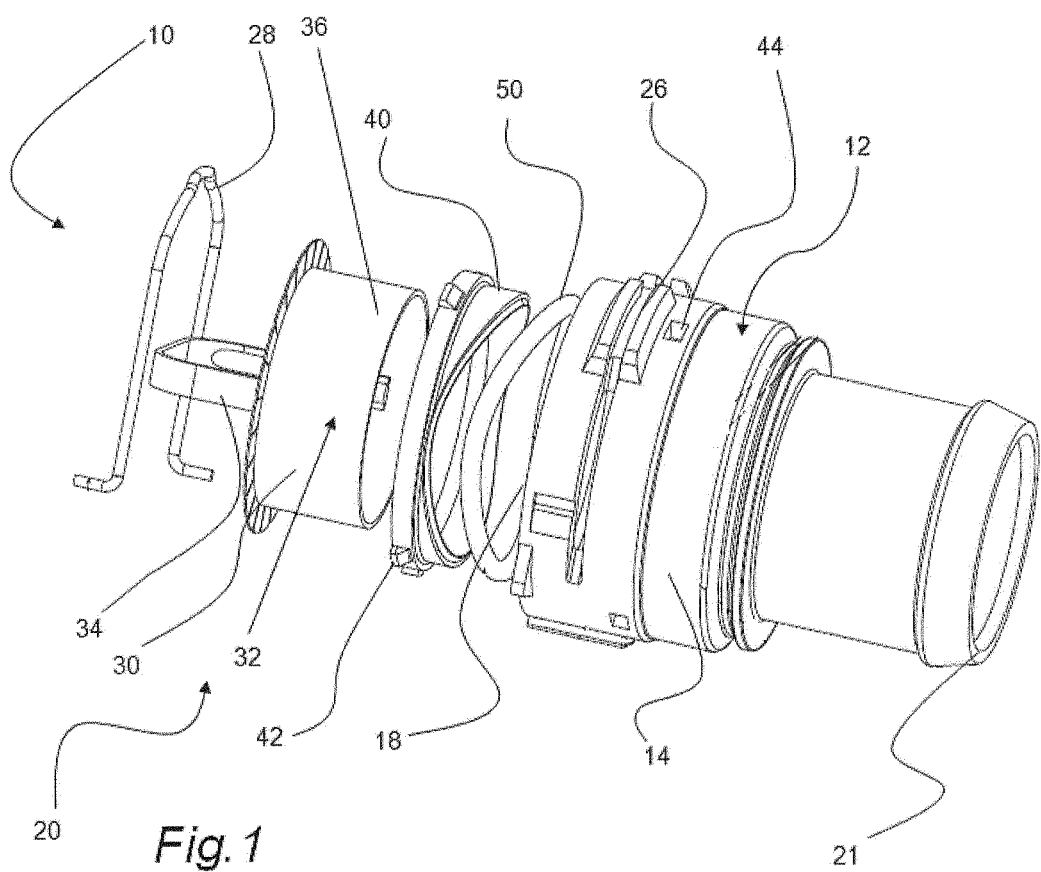
FIG. 1 shows an exploded view of a fluid connection comprising a seal in accordance with the invention in which the male connector is a temporary transport cap.

FIGS. 1 to 6 show a fluid connection according to the invention. This fluid connection bears the general reference numeral 10. This fluid connection 10 comprises a female connector 12 and a male connector 20 described below.

In particular, such a fluid connection 10 may be part of a circuit for transporting a fluid, such as a cooling fluid for an engine or a battery of a motor vehicle. For example, it is designed for the quick assembly of a first fluid tubular element such as a tubing with an annular groove or flange to a second fluid conduit element such as a flexible hose (not shown in the figures) designed to be connected, for example, by fitting to the fluid connection 10. The flexible hose is, for example, made of an elastomeric material, such as rubber.

Figure 2:
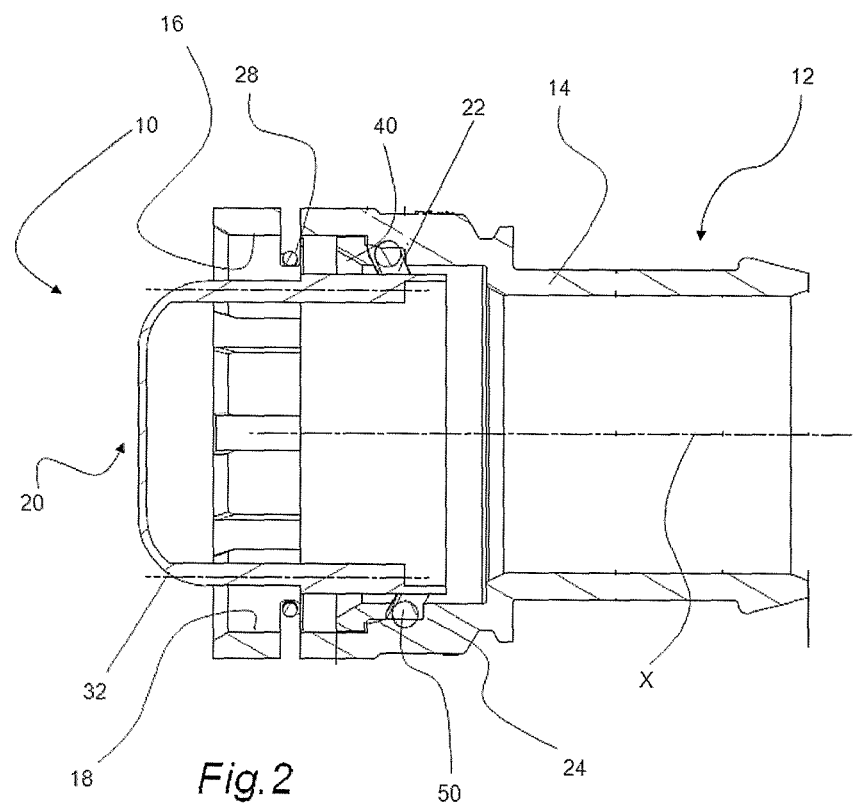
FIG. 2 shows a cross-sectional view of the fluid connection shown in FIG. 1 in the assembled state.

For example, with reference to FIGS. 1 and 2, the female connector 12 of the fluid connection 10 is shown in detail. In general, the female connector 12 can include a main body 14 with a generally tubular shape having an axial passage 16 extending longitudinally across the body 14. A first connection end 18 of the passage 16 (or receiving orifice 18) can be dimensioned to slidingly receive a tubular end 36 of the end piece of the male connector 20 (described below). The tubular body 14 defines a main insertion axis X along which the male connector 20 can be inserted. Preferably, on another side 21, the female component 12 is provided with another end for connection to a second fluid transport conduit such as a flexible hose (not shown in the figures).

Preferably, the body 14 can include a radial groove 22 formed inside the body 14 on an inner wall of the passage 16 which is internally spaced from the connection end 18 of the body 14. The groove 22 can have a variety of cross-sectional profiles (for example, rounded, square, rectangular, trapezoidal, polygonal, etc.) and can generally be formed continuously around the inner circumference of said passage 16.

In this example, the male connector 20 also comprises a body 30 provided with an insertion male end 36 having a complementary shape to the female connection end 18 to enable engagement by fitting along the main insertion axis X inside the passage 16 of the female connector 12. In the example shown in FIG. 1 or FIG. 2, the male component 20 has a generally tubular shape closed at one end to form a temporary transport cap or plug 32 provided with a gripping handle 34.

Figure 3:
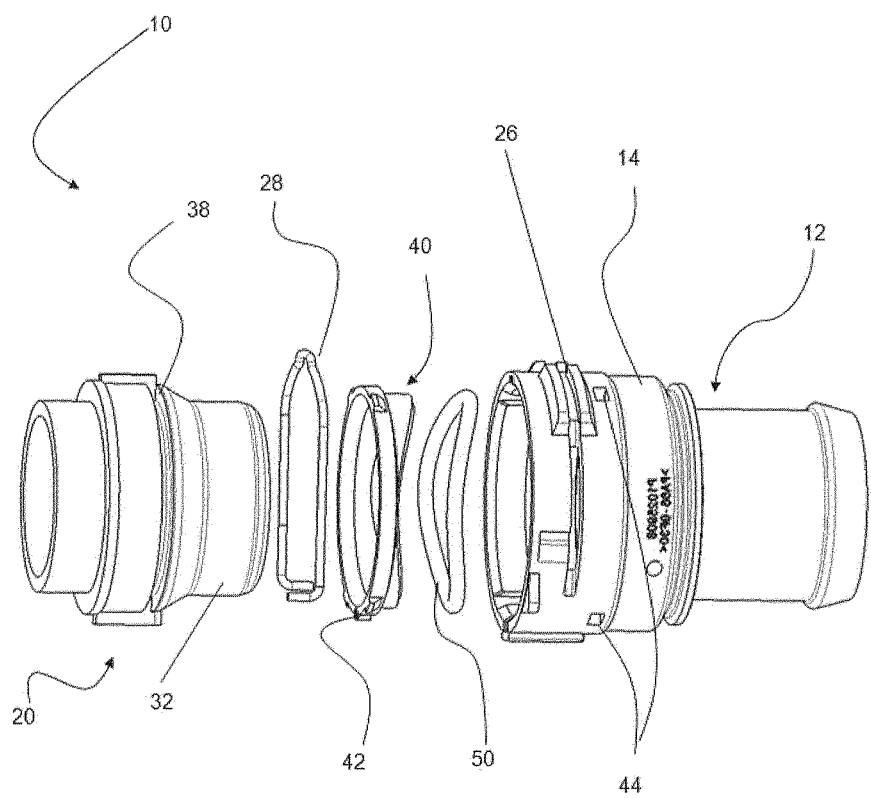
FIG. 3 shows an exploded view of a fluid connection comprising a seal in accordance with the invention in which the male connector is a male connection end piece.
Figure 4:
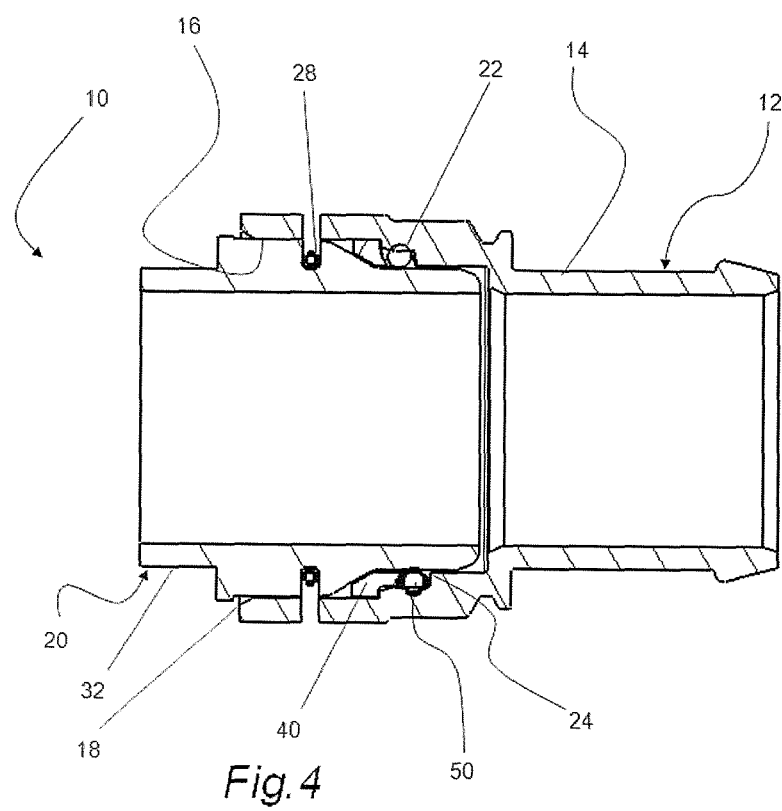
FIG. 4 shows a cross-sectional view of the fluid connection shown in FIG. 3 in the assembled state.

In the example shown in FIGS. 3 and 4, the male connector 20 is a male connection end piece. In these figures, the body 30 of the male end piece 20 also comprises a circumferential groove 38 and the main body 14 of the female connector 12 comprises slots 26 extending in a circumferential direction to the main body 14. The fluid connection 10 also comprises a clip 28 designed to be engaged as a jumper inside the grooves 26 of the female connector 12 in order to cooperate with the circumferential groove 38 and thus retain the male connector 20 inside the passage 16 of the female connector 12.

According to the invention, the fluid connection 10 also comprises an O-ring seal 50. The O-ring seal 50 can be partially arranged inside the groove 22. As described in detail below, the seal 50 can be dimensioned to fit tightly around the male connector 20 when the latter is received inside the passage 16. The seal 50 can be formed from any suitable material, for example vulcanized rubber, silicone, synthetic elastic and/or elastic material, etc.

In the preferred embodiment of the invention, the seal 50 is supported by the female connector 12. In this case, the seal 50 is, for example, annular or an O-ring and is inserted inside the passage 16 in the annular groove 22 provided for this purpose.

In the preferred embodiment of the invention, the male connector 20 has a circumferential engagement surface designed to engage tightly against the seal 50, when the male connector 20 is inserted inside the axial passage 16 of the female connector 12.

For example, the male 20 and female 12 connectors have complementary shapes of mutual engagement delimiting, in the inserted state, a closed annular cavity for housing the seal 50, defined by the annular groove 22 closed by the circumferential engagement surface of the male connector 20.

Preferably, the female connector 12 also comprises an internal peripheral shoulder 24 delimiting a radial surface forming an annular sealing seat, designed to form one of the side walls of the annular groove 22.

As shown clearly in the cross-sectional view of the fluid connection 10 shown in FIG. 4, the seal 50 is radially compressed inside the annular groove 22 of the male connector 20 after it has been inserted inside the female connector 12.

In the preferred embodiment of the invention, the female connector 12 includes a retaining ring 40 which is inserted on the side of the connection end 18 of the body 14 of the female connector 12. This retaining ring 40 has an external diameter which is adjusted to the internal diameter of the connection end 18 of the body 14 such that the retaining ring 40 can be inserted inside the body 14 of the female connector 12. In addition, the retaining ring 40 preferably has latching lugs 42 on its outer surface cooperating with openings 44 of the female connector 12 in order to position and retain the ring 40 inside the female connector 12.

In addition, as shown in FIG. 4, the insertion end face of the retaining ring 40 inside the female connector 12 forms a side wall of the groove 22 of the female connector 12. It should preferably be noted that the groove 22 is not contained in a transverse plane, perpendicular to the main insertion axis X.

Thanks to the retaining ring 40 which radially forms a wall of the groove 22, the seal 50 is retained in the main body 14 of the female connector 12 between the retaining ring 40 and the internal shoulder of the female connector 12.

According to the invention, more specifically, the seal 50 comprises an undulating profile along a circumferential path centred on the axis X which has a variable axial amplitude relative to a reference transverse plane (not shown) perpendicular to the main axis X between lower PI and upper PS transverse planes.

Figure 5:
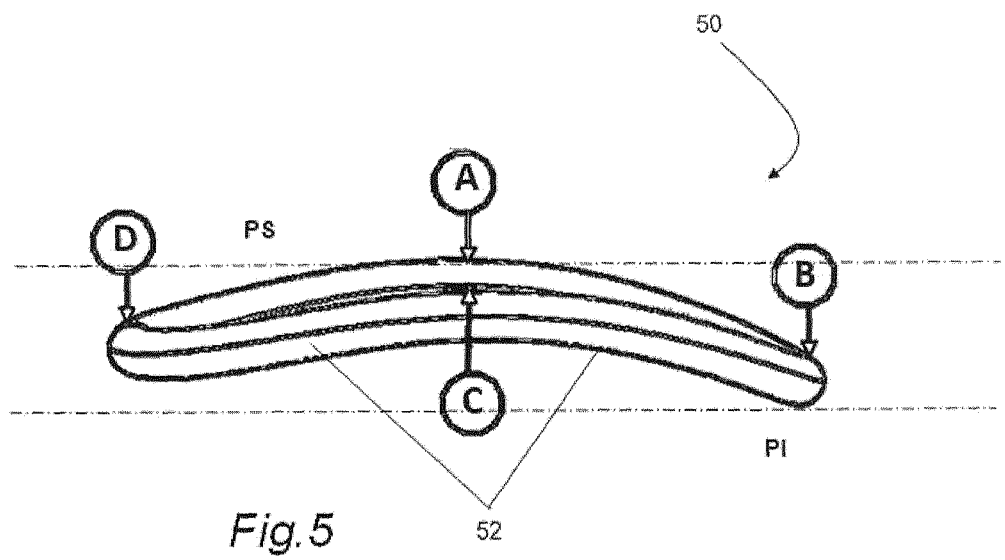
FIG. 5 shows a detailed perspective view of the seal shown in FIG. 1.

As shown in FIG. 5, the undulating profile of the seal has a plurality of undulations and comprises at least two peak crests (A, C) and at least two trough crests (B, D) that are formed by axial excursions relative to the reference transverse plane.

Figure 6:
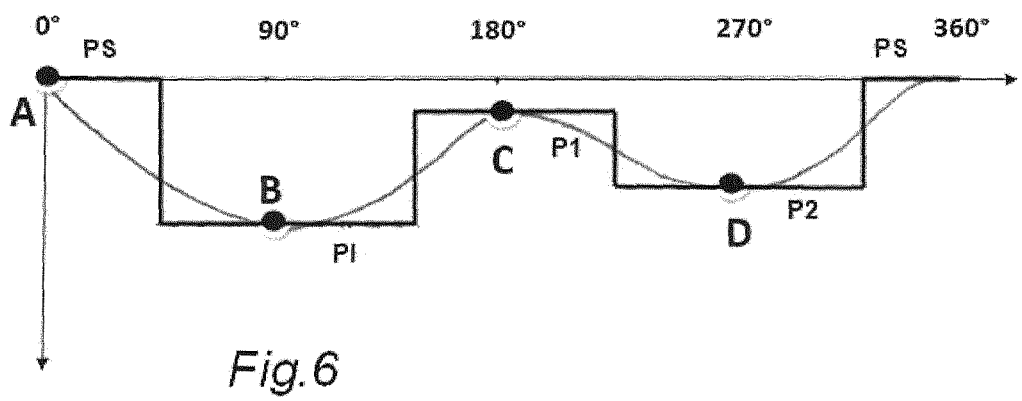
FIG. 6 shows a specific example of the 360° variation in the axial amplitude of the seal shown in FIG. 5 relative to a reference transverse plane.

As shown in a highly schematic manner in FIG. 6, at least one peak crest (A) and at least one trough crest (B) are each respectively arranged on the upper transverse plane PS and on the lower transverse plane PI and at least one peak crest (C) and at least one trough crest (D) are each located on intermediate transverse planes P1 and P2. In particular, the intermediate planes P1 and P2 are axially offset from one another and are located axially strictly between the lower plane PI and the upper plane PS.

Thanks to this configuration, the compression of the seal 50 follows a stepped profile in which the steps are defined by each of the lower PI, upper PS and intermediate P1 and P2 planes during the axial insertion of the male 20 and female 12 connectors of the fluid connection 10 (FIG. 6). Preferably, connection portions 52 of the seal 50 extending between the peak crests and the trough crests are curvilinear. In addition, the peak crests A, C (and/or the trough crests B, D) extend diametrically opposite each other.

For example, upon fitting, a first 12 of the connectors is designed to carry the seal 50 and a second 20 of the connectors has a circumferential engagement surface designed to engage tightly against the seal 50.

Preferably, the male and/or female connector is made from a plastic material, for example by plastic moulding. However, in one variant of the invention, the male connector and/or the female connector is made from a metallic material.

The contact pressure exerted on the seal 50 when the male connector 20 is fitted inside the female connector 12 thus guarantees an effective sealed connection between the two connectors 12, 20.

The main aspects of the invention will now be described with reference to the two embodiments described above and shown in FIGS. 1 to 6.

First of all, the seal 50 is fitted on one of the male 20 or female 12 connectors. In the preferred embodiment of the invention, the seal 50 is fitted inside the annular groove 22 of the female connector 12, delimited axially by an internal peripheral shoulder 24 formed in the inner surface of the female connector 12 and by an end face of the retaining ring 40.

Then, in a second step, the insertion end 36 of the male connector 20 is inserted into the connection end of the female connector 12. During this insertion, the engagement surface of the male connector 20 radially deforms the seal 50 in order to be able to overcome the relief created by the seal 50.

As the seal 50 is not flat, but rather provided with undulations according to the very specific profile defined by the invention, the pressure exerted by the engagement surface of the male connector 20 on the seal 50 is gradual, which facilitates the instant insertion of the male connector 20 inside the axial passage 16 of the female connector 12.

The gradual contact pressure exerted by the engagement surface of the male connector 20 on the seal 50 reduces the instant insertion or introduction effort of the male end piece 20 inside the female end piece 12, by first compressing one side, then the opposite side and then the left and right sides, one by one.

Consequently, the profile of the insertion force intensity seems to follow a very gradual staircase without causing any additional effort during insertion.

Of course, the invention is not limited to the embodiments described above. Other embodiments accessible to a person skilled in the art can also be envisaged without departing from the scope of the invention defined by the claims below.

The invention claimed is:

1. An o-ring seal for a fluid connection with a main insertion axis, of the type comprising an undulating profile following a circumferential path centred on the axis which has a variable axial amplitude relative to a reference transverse plane perpendicular to the main axis between two, lower and upper, transverse planes and designed to define a non-planar geometric profile of the seal, the undulating profile having at least two peak crests and at least two trough crests that are formed by axial excursions relative to the reference transverse plane, wherein at least one peak and one trough are located on the upper and lower planes respectively and at least the other of the peaks and troughs are each located on an intermediate transverse plane plane, the intermediate planes being axially offset from one another and located axially strictly between the two upper and lower planes in such a way that the compression of the seal follows a stepped profile in which the steps are defined by each of the upper, intermediate and lower planes.

2. The seal according to claim 1, wherein portions of the seal connecting the crests are curvilinear.

3. The seal according to claim 1, wherein the peak crests and/or the trough crests each extend facing one another.

4. A fluid connection for a fluid circuit, of the type comprising:
a female connector comprising a main body provided with a female receiving orifice with a main insertion axis,
a male connector comprising a main body provided with a male insertion end piece having a shape complementary to the female receiving orifice in order to cooperate by fitting together along the main insertion axis,
an O-ring seal designed to provide a fluid-tightness between the connectors,
and wherein, upon fitting, a first of the connectors is designed to carry the seal and a second of the connectors has a circumferential engagement surface designed to tightly engage against the seal, wherein the seal is according to claim 1.

5. The connection according to claim 4, wherein the connectors have complementary shapes of mutual engagement delimiting, in the fitted state, an internal annular cavity for housing the seal.

6. The connection according to claim 4, wherein the female connector comprises a peripheral shoulder internally delimiting a radial surface forming an annular sealing seat designed to receive the O-ring seal.

7. The connection according to claim 4, wherein the female connector comprises a retaining ring inserted into the main body on the side of the connection end to define an annular groove, being open radially inwards and not being contained in a transverse plane for receiving the O-ring seal.

8. The connection according to claim 5, wherein the seal is radially compressed inside the annular groove by the male connector after it has been inserted into the female connector.

9. The connection according to claim 8, wherein the female connector comprises slots in a circumferential direction and also comprises a jumper engaged in the slots to retain the male connector inside the body of the female connector.

10. The connection according to claim 4, wherein the male and female connectors are made from a plastic material or metallic material.

* * * * *